United States Patent [19]
Allison

[11] 3,992,036
[45] Nov. 16, 1976

[54] INDEPENDENT FRONT SUSPENSION SYSTEM FOR A MOTOR VEHICLE

[75] Inventor: William D. Allison, Grosse Pointe Farms, Mich.

[73] Assignee: Ford Motor Company, Dearborn, Mich.

[22] Filed: July 7, 1975

[21] Appl. No.: 593,805

[52] U.S. Cl. ................................. 280/695; 280/664
[51] Int. Cl.² .................... B60G 3/18; B60G 11/18
[58] Field of Search ........ 280/124 A, 124 B, 96.2 R

[56] References Cited
UNITED STATES PATENTS

| 3,733,087 | 5/1973 | Allison | 280/124 B X |
| 3,750,774 | 8/1973 | Trapp | 280/124 B X |

Primary Examiner—Philip Goodman
Attorney, Agent, or Firm—Clifford L. Sadler; Keith L. Zerschling

[57] ABSTRACT

An independent suspension system for a motor vehicle is disclosed having left and right road wheels rotatably supported by left and right wheel support members. Each of the wheel support members is positioned by laterally extending upper and lower suspension arms. A pair of torsion bar springs interconnect the left and right lower suspension arms and function as main suspension springs, as anti-roll stabilizers and as drag struts locating the suspension arms longitudinally. The torsion bars have single loops or coils in their drag strut portions to provide a desired low spring rate for the suspension.

12 Claims, 3 Drawing Figures

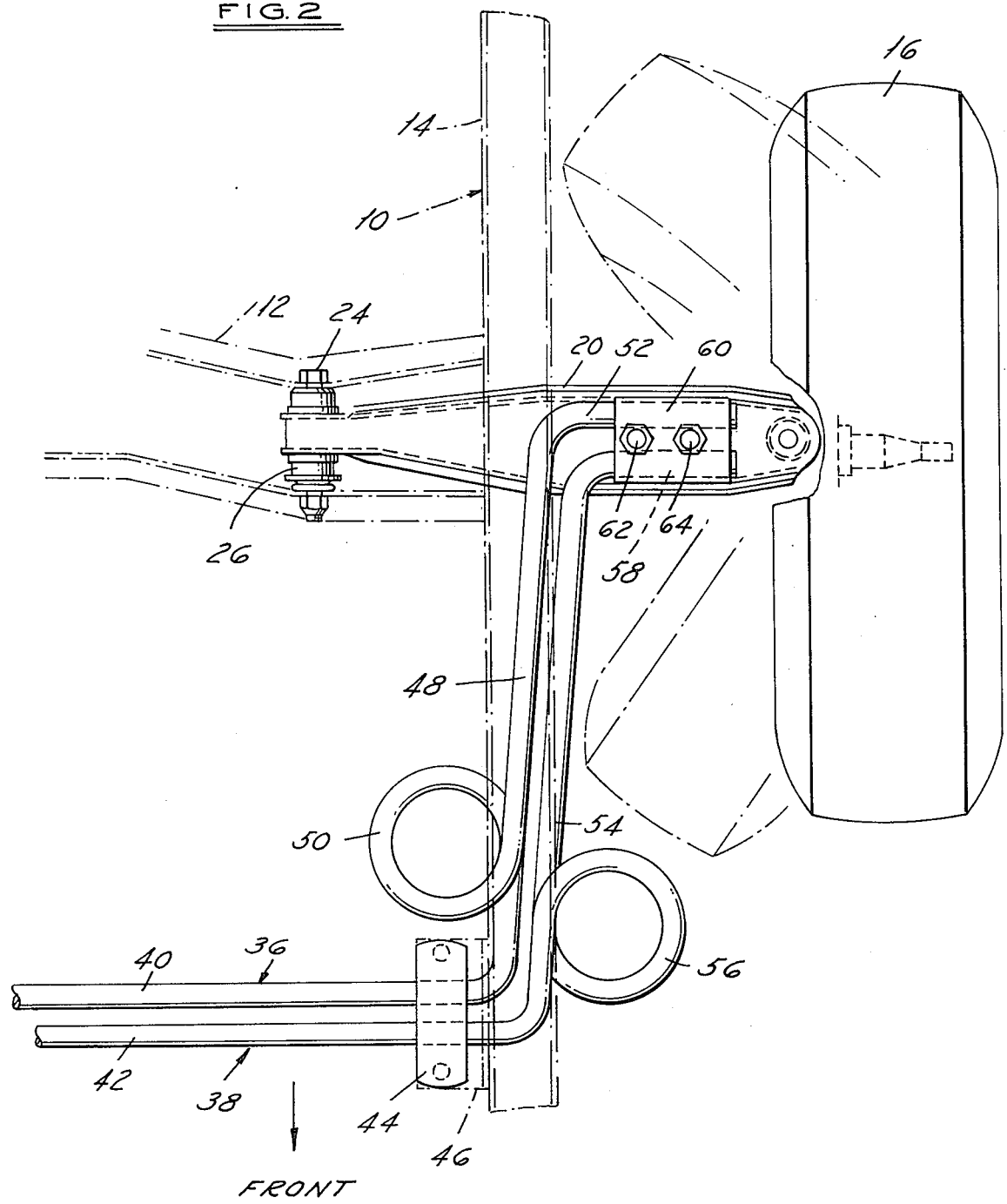

INDEPENDENT FRONT SUSPENSION SYSTEM FOR A MOTOR VEHICLE

BACKGROUND OF THE DISCLOSURE

The present invention relates to independent front suspension systems for motor vehicles. In one construction of the invention, upper and lower suspension arms determine the path of the vehicle wheels during jounce and rebound movement. A multi-purpose torsion bar spring means interconnects the left and right wheel suspensions.

The torsion bar suspension of this disclosure is related to, and in some circumstances may constitute an improvement of, the torsion bar suspension shown in my U.S. Pat. No. 3,733,087, issued May 15, 1973.

BRIEF SUMMARY OF THE DISCLOSURE

In the presently preferred embodiment of this invention, an independent front suspension is provided having left and right laterally extending lower suspension arms and left and right upper suspension arms. The left and right sets of arms are pivotally connected to the vehicle frame at their inner ends and pivotally connected to left and right wheel supports at their outer ends. Left and right road wheels are rotatably supported on the wheel support members.

A pair of torsion bar springs have their outer ends clamped to the left and right lower suspension arms. The springs have transverse portions that extend across the frame of the vehicle and are supported thereon at spaced points forwardly of the lower suspension arms. Portions of the spring bars extend longitudinally from the frame supports to the lower suspension arms and constitute drag struts. Each strut has a single integral loop or coil. A suspension system having torsion bars with the loops formed therein has a desirable low spring rate while the bars are of compact construction for ease of packaging within the vehicle.

The torsion bars serve a plurality of functions. The bars provide the principle resilient support for the chassis upon the suspension arms. The spring bars also provide an anti-roll stabilizer function. Finally, the spring bars function as struts to provide longitudinal stability to the lower suspension arms and the wheel support members.

BRIEF DESCRIPTION OF THE DRAWINGS

The many objects and advantages of an independent front suspension for a motor vehicle constructed in accordance with this invention will become apparent upon consideration of the following detailed discussion and the accompanying drawings, in which:

FIG. 2 is a top plan view of the suspension of FIG. 1 with the upper suspension arm removed to show the construction of the lower suspension arms and the torsion bar springs of the suspension.

DETAILED DESCRIPTION OF A PREFERRED EMBODIMENT

Figure 1:
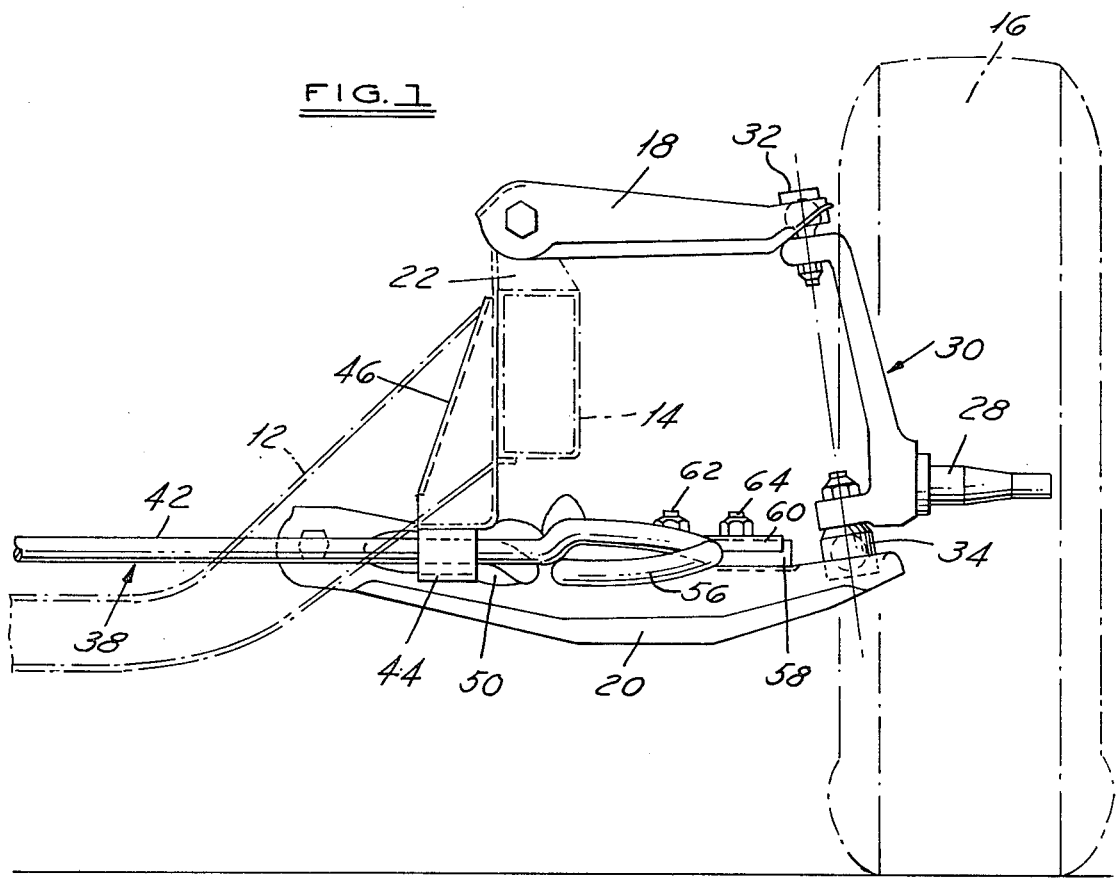
FIG. 1 is a front elevational view of the left half of an embodiment of the independent front suspension of this invention.
Figure 3:
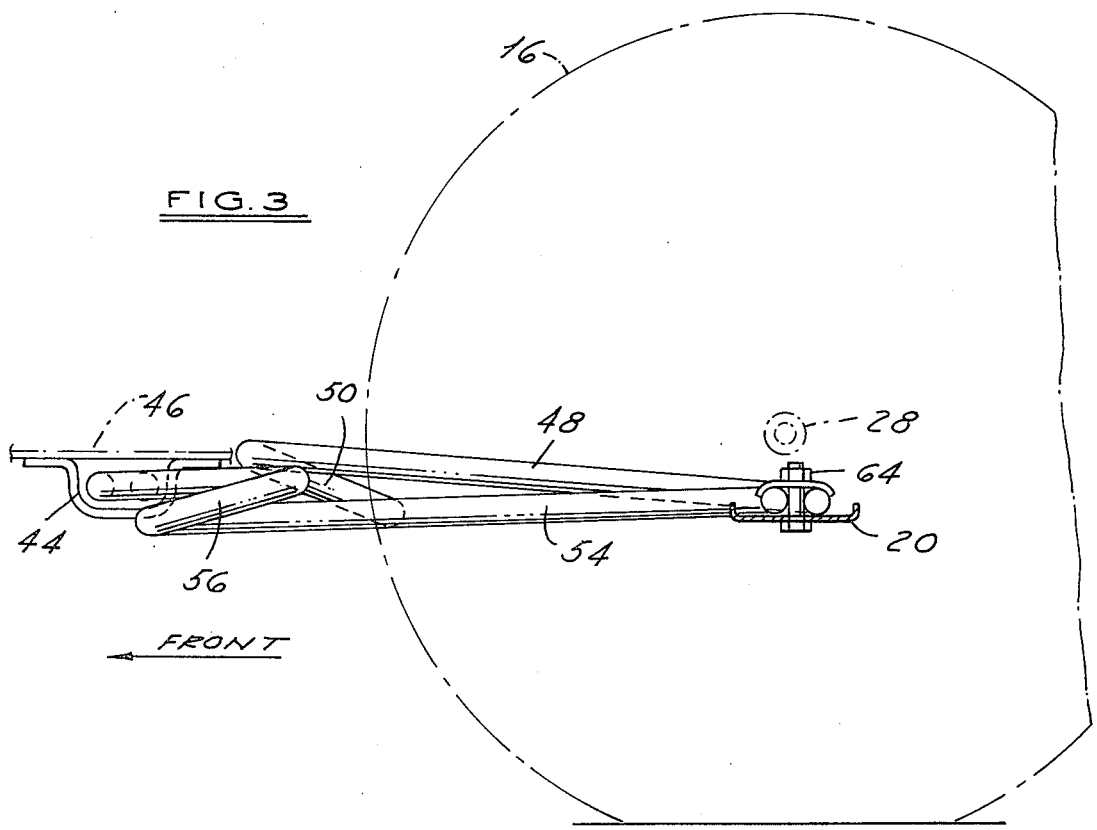
FIG. 3 is a side elevational view of the torsion bars of the suspension of FIG. 1 and their connection to the vehicle frame and the lower suspension arm.

Referring now to the drawings, wherein a presently preferred embodiment of this invention is illustrated, FIGS. 1 and 2 disclose the left half of an independent front suspension for a motor vehicle. The suspension is symmetrical and only the left half has been illustrated in order to reduce the complexity of the drawings and the disclosure.

A vehicle frame assembly 10 includes a cross frame member 12 and a longitudinally extending side rail 14. A left steerable road wheel 16 is positioned adjacent to the frame 10 and is connected thereto by upper and lower suspension arms 18 and 20. The upper arm 18 is pivotally connected at its inner end to a bracket 22 that is supported on the side rail 14. The inner end of the lower arm 20 is pivotally connected to the cross frame member 12.

The cross frame member 12 has a generally channel shape. A pivot bolt 24 extends through the side walls of the frame member 12 and through a bushing 26 positioned within an eye formed at the inner end of the lower suspension arm 20.

The road wheel 16 is rotatably supported on the spindle portion 28 of a wheel support member 30. The upper end of the wheel support 30 is pivotally connected to the outer end of the upper suspension arm by a ball and socket joint 32. The lower end of the wheel support 30 is pivotally connected to the laterally outer end of the lower suspension arm 20 by means of a lower ball joint 34.

The suspension system thus far described provides an articulated connection between the wheel 16 and the vehicle frame 10. The wheel 16 is free to traverse a vertical jounce and rebound path with the upper and lower arms 18 and 20 pivoting about their connections with the frame bracket 22 and transverse frame member 12, respectively. The wheel 16 may be pivoted for steering purposes about a vertical steering axis extending through the centers of the ball and socket joints 32 and 34.

In accordance with the present invention, means are provided to support the vehicle frame 10 upon the lower suspension arms and the road wheels, to control body roll and to stabilize the longitudinal position of the lower suspension arms. In the illustrated embodiment of the invention a pair of torsion bars 36 and 38 are provided to perform these functions. The bars 36 and 38 have transversely extending midportions 40 and 42 which are journalled in a rubber bushing 44 mounted on a bracket 46 welded to the frame side rail 14. The bar 40 has a longitudinally rearwardly extending strut portion 48 with an integral single coil 50 situated near its forward end. The coil 50 is a 360 degree closed loop. The rearward end 52 of the strut portion 48 is bent outwardly to form a load lever arm.

The second torsion bar 38 has a rearwardly extending strut portion 54 with a single coil or loop 56 situated near its forward end. The rearward end 58 of the strut portion 54 of the bar 38 is bent outwardly to form a load lever arm. The load lever arm portions 52 and 58 of the bars 36 and 38 rest upon the lower suspension arm 20 and are secured thereto by means of a clamp 60 and a pair of bolts 62 and 64.

It will be noted from FIG. 1 that the loop portions 50 and 56 in the strut portions 48 and 50 of the torsion bars are looped in different directions so that their centers are spaced apart when observed in the plan view. With this construction, movement of the bars during jounce and rebound displacement of the road wheels will not cause the loop portions to come into contact or otherwise interfere with each other.

The construction of the suspension system at the right side of the vehicle is similar to that illustrated in the three drawing figures. The torsion bars 36 and 38 have their transverse portions 40 and 42 supported by bushings that are secured to the right side rail of the frame 10. The bars 36 and 38 have longitudinally extending right strut portions with loops and are rigidly secured at their outwardly bent right ends to the right lower suspension arm.

In a manner similar to the construction of the torsion bars in U.S. Pat. No. 3,733,087, the bars 36 and 38 are preformed so that when they are clamped to the vehicle frame 10 and to the lower suspension arms 20 they will be stressed in a manner to support the weight of the vehicle frame upon the lower arms and upon the front wheels 16.

SUMMARY

The illustrated preferred embodiment of this invention provides an independent front suspension system for left and right road wheels of a motor vehicle and includes upper and lower suspension arms connected to the vehicle frame and to left and right wheel support members. A pair of torsion bar springs 38 and 36 are connected to the vehicle frame 10 and to the lower suspension arms 20. The torsion bars 36 and 38 function to reinforce or stabilize the longitudinal position of the lower arms, to support a portion of the vehicle weight upon the front wheels 20 and to provide anti-roll stability to the body of the motor vehicle.

The coils or loops 50 and 56 are provided in the torsion bars 36 and 38 to increase the effective length of the bars and thereby decrease the spring rate of the suspension. By using this means for lowering spring rate, the torsion bars 36 and 38 have a compact construction.

The total suspension is characterized by its light weight, optinum use of space, low cost and good performance.

The foregoing description presents the presently preferred embodiment of this invention. Modifications and alterations may occur to those skilled in the art that will come within the scope and spirit of the following claims.

I claim:
1. An independent suspension system for a motor vehicle comprising a vehicle frame, a road wheel, and suspension means connecting said wheel to said frame;
    said suspension means comprising a wheel support member rotatably supporting said road wheel;
    a suspension arm interconnecting said wheel support member and said frame;
    a spring bar having a first portion mounted on said vehicle frame at a location longitudinally spaced apart from the axis of rotation of said wheel;
    said bar having a second end portion connected to said suspension arm;
    said bar having at least one integral loop situated intermediate said first and second portions;
    said loop being arranged in a generally horizontal plane.
2. An independent suspension system according to claim 1 and including:
    said bar having an integral single 360° loop situated intermediate said first and second portions;
    said 360° loop and said first and second portions of said spring bar being disposed in a generally horizontal plane.

3. An independent suspension system according to claim 1 and including:
    said first and second bar portions extending generally transversely with respect to said vehicle frame when said suspension is observed in the plan view;
    said first and second bar portions being longitudinally spaced apart.
4. An independent suspension system for a motor vehicle comprising a vehicle frame, left and right steerable road wheels and suspension means connecting said wheels to said frame;
    said suspension means comprising mutually independent left and right wheel support members rotatably supporting said left and right road wheels;
    left and right suspension arms connected to said left and right wheel support members, respectively, and to said frame;
    a torsion bar having a generally transverse portion mounted on said vehicle frame;
    said bar having left and right bar portions connected to said left and right suspension arms;
    said left and right bar portions being connected to said transverse portion;
    said left and right bar portions each having an integral loop.
5. An independent suspension system according to claim 4 and including:
    said loops of said left and right bar portions each comprising at least a 360° loop.
6. An independent suspension system according to claim 4 and including:
    said bar having left and right bar portions each including strut portions extending in a generally longitudinal direction.
7. An independent suspension system according to claim 4 and including:
    said transverse portion of said bar being longitudinally spaced apart from the axis of rotation of said wheels;
    said left and right bar portions comprising laterally extending end portions connected to said left and right suspension arms;
    said left and right bar portions also comprising left and right strut portions interconnecting said end portions and said transverse portion;
    said loops forming a part of said left and right strut portions.
8. An independent suspension system for a motor vehicle comprising a vehicle frame, left and right road wheels and suspension means connecting said wheels to said frame;
    said suspension means comprising left and right wheel support members rotatably supporting said left and right road wheels, respectively;
    left and right suspension arms connecting said left and right wheel support members, respectively, to said frame;
    a plurality of torsion bars having generally parallel transversely extending portions mounted on said vehicle frame;
    said transverse portions being longitudinally spaced apart from the axis of rotation of said wheels;
    said torsion bars having left and right end portions connected to said left and right suspension arms, respectively;
    said torsion bars having left and right strut portions interconnecting said end portions and said transverse portions;

said strut portions each having an integral loop;
said torsion bars being constructed to resiliently support said frame on said suspension arms.

9. An independent suspension system for a motor vehicle according to claim 8 and including:
each of said loops of said strut portions being a 360° loop.

10. An independent suspension system for a motor vehicle according to claim 8 and including:
the centers of said loops being spaced apart when said suspension system is observed in the plan view.

11. An independent suspension system for a motor vehicle comprising a vehicle frame, left and right road wheels and suspension means interconnecting said wheels and said frame;
said suspension means comprising left and right wheel support members rotatably supporting said left and right road wheels, respectively;
left and right upper suspension arms pivotally connecting said left and right wheel support members, respectively, to said vehicle frame;
left and right lower suspension arms pivotally connecting said left and right wheel support members, respectively, to said vehicle frame;
a pair of torsion bars having parallel side-by-side transversely extending portions mounted on said vehicle frame;
said transverse portions being longitudinally spaced apart from the axis of rotation of said road wheels;
said torsion bars each having laterally outwardly extending end portions;
clamping means securing said end portions to said left and right lower suspension arms;
said torsion bars each having strut portions interconnecting said transverse portions and said end portions;
each of said strut portions having a 360° loop formed therein;
the centers of said loops being laterally spaced apart when said suspension system is observed in the plan view;
said torsion bars being constructed to resiliently support said frame on said lower suspension arms.

12. An independent suspension system for a motor vehicle comprising a vehicle frame, left and right road wheels and suspension means interconnecting said wheels and said frame;
said suspension means comprising left and right wheel support members rotatably supporting said left and right road wheels, respectively;
left and right suspension arms pivotally connecting said left and right wheel support members, respectively, to said vehicle frame;
a torsion spring bar having a transversely extending portion mounted on said vehicle frame at a location spaced apart longitudinally from the axis of rotation of said road wheels;
said torsion spring bar having laterally outwardly extending end portions and means securing said end portions to said left and right suspension arms;
said end portions being longitudinally spaced apart from said transverse portion;
said torsion spring bar having left and right strut portions interconnecting said transverse portion and said end portions;
each of said strut portions having a loop formed therein;
the centers of said loops being laterally spaced apart when said suspension sytem is observed in the plan view;
said torsion bar being constructed to resiliently support a portion of the mass of said frame on said lower suspension arms.

* * * * *